United States Patent
Brugger et al.

(10) Patent No.: US 9,453,746 B2
(45) Date of Patent: Sep. 27, 2016

(54) VOLUMETRIC-FLOW MEASURING APPARATUS HAVING A FOLDABLE FLOW STRAIGHTENER

(71) Applicant: Testo AG, Lenzkirch (DE)

(72) Inventors: Simon Brugger, Lenzkirch (DE); Martin Rombach, Lenzkirch (DE)

(73) Assignee: Testo AG, Lenzkirch (DE)

( * ) Notice: Subject to any disclaimer, the term of this patent is extended or adjusted under 35 U.S.C. 154(b) by 0 days.

(21) Appl. No.: 14/593,247

(22) Filed: Jan. 9, 2015

(65) Prior Publication Data

US 2015/0198468 A1    Jul. 16, 2015

(30) Foreign Application Priority Data

Jan. 10, 2014 (DE) .......................... 10 2014 000 241

(51) Int. Cl.
*G01F 1/00* (2006.01)
*G01F 1/05* (2006.01)
*F24F 13/06* (2006.01)
*F24F 13/08* (2006.01)

(52) U.S. Cl.
CPC ................ *G01F 1/05* (2013.01); *F24F 13/06* (2013.01); *F24F 13/08* (2013.01); *F24F 2013/088* (2013.01)

(58) Field of Classification Search
None
See application file for complete search history.

(56) References Cited

U.S. PATENT DOCUMENTS

| | | | |
|---|---|---|---|
| 2,932,740 A | | 4/1960 | Widmyer |
| 3,733,900 A | | 5/1973 | DeBaun |
| 4,231,253 A | * | 11/1980 | Ohnhaus .................. G01F 1/40 73/861.62 |
| 4,297,900 A | | 11/1981 | Brandt, Jr. |
| 4,481,829 A | * | 11/1984 | Shortridge ............... G01F 1/46 73/861.66 |
| 4,548,076 A | * | 10/1985 | Haake ...................... G01F 5/00 73/861.66 |

FOREIGN PATENT DOCUMENTS

| | | |
|---|---|---|
| DE | 10139542 | 3/2003 |
| GB | 1531143 | 11/1978 |
| WO | 8701443 | 3/1987 |
| WO | 0123844 | 4/2001 |

* cited by examiner

*Primary Examiner* — Harshad R Patel
(74) *Attorney, Agent, or Firm* — Volpe and Koenig, P.C.

(57) ABSTRACT

A volumetric-flow measuring apparatus (1) is provided using a measuring funnel (4) and a flow straightener (6) from a foldable material, which is disposed in the measuring funnel (4), configured such that the measuring funnel (4) and the flow straightener (6) are convertible between a folded-up transport position and an unfolded use position.

11 Claims, 1 Drawing Sheet

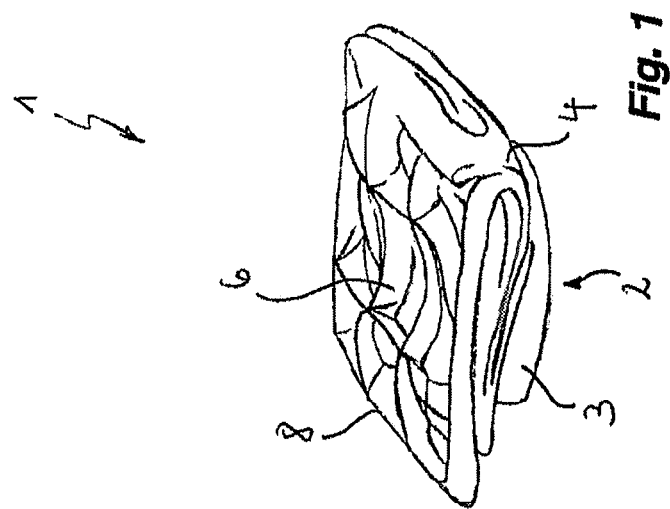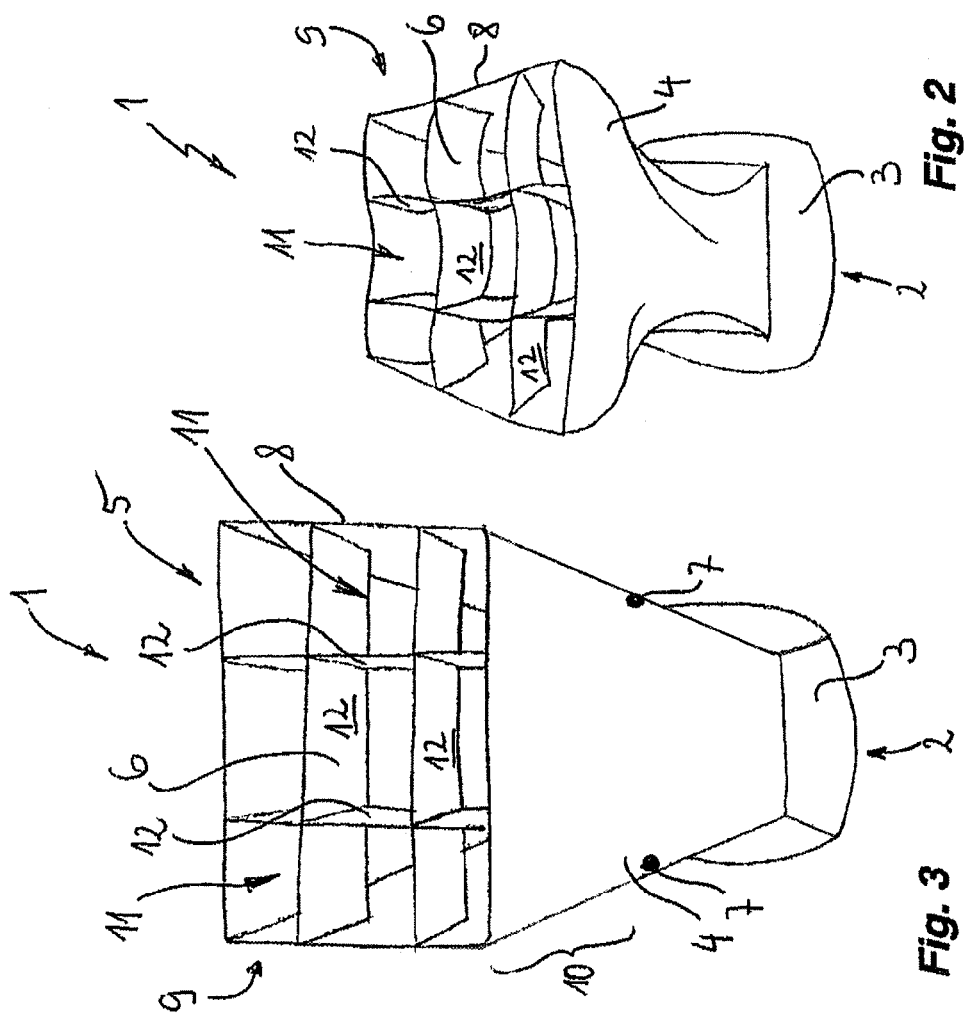

VOLUMETRIC-FLOW MEASURING APPARATUS HAVING A FOLDABLE FLOW STRAIGHTENER

INCORPORATION BY REFERENCE

The following documents are incorporated herein by reference as if fully set forth: German Patent Application No. 102014000241.1, filed Jan. 10, 2014.

BACKGROUND

The invention relates to a volumetric-flow measuring apparatus having a basic body which receives a measuring unit, and a measuring funnel from a foldable material, which is attached on the basic body, wherein the measuring funnel is convertible from a transport position to a use position.

Volumetric-flow measuring apparatuses of this type are known for example as volumetric flow hoods and are employed for measuring a volumetric flow through a supply-air or exhaust-air opening of a building ventilation plant.

To this end the measuring funnel by way of an air intake is placed onto the supply-air or exhaust-air opening of the building ventilation plant. Using the measuring unit, for example an anemometer, the volumetric flow through the supply-air or exhaust-air opening can thus be measured.

It is known for the measuring funnels to be configured from a foldable material, in order to fold up the measuring funnel into a transport position. In this transport position the measuring funnel occupies little space and is easily transportable.

It has emerged that large measuring errors may occur in the measurement of volumetric flow when the flow to be measured has a swirl. Measuring errors of this type may be present in the order of 50% or more of the measured values. It has, therefore, been proposed to use flow straighteners with which the air flow can be de-swirled in that fractions of the flow having a flow angle in relation to a longitudinal axis of the flow straightener that lies above a specific threshold value are oriented or diverted, respectively.

It has been proposed to this end in DE 10139542 B4 to directly dispose a louvre grid construction as a flow straightener on air-guide elements of a supply-air opening which is configured as a swirl distributor for the duration of the measurement. However, this necessitates separate assembly of the flow straightener prior to the measurement.

The invention is concerned with improving the useful properties of a volumetric-flow measuring apparatus.

SUMMARY

One or more features according to the invention are provided in order to achieve this object. In the case of a volumetric-flow measuring apparatus of the type described at the outset, the invention thus in particular proposes that in a funnel opening which is defined by the measuring funnel a flow straightener from a foldable material is disposed, that the flow straightener is convertible between a transport position and a use position, and that the flow straightener in the use position adapts to the measuring funnel. It is advantageous here that the volumetric-flow measuring apparatus can be equipped with a flow straightener which likewise has small dimensions in the transport position. It is furthermore advantageous that the flow straightener is provided so as to be ready for use in the use position of the measuring funnel. Additional assembly steps for the flow straightener can thus be dispensed with. This significantly simplifies the handling of the volumetric-flow measuring apparatus and thus represents an improvement of the useful properties.

In one embodiment of the invention it may be provided that a deployment device by way of which the measuring funnel is deployable from the transport position into the use position is present. It is advantageous here that starting up of the volumetric-flow measuring apparatus is achievable with simple manipulations. The deployment device preferably has an arrangement of deployment rods which keep the measuring funnel deployed in the use position.

In one embodiment of the invention it may be provided that the flow straightener is deployable by way of a deployment device, for example the deployment device already mentioned. It is advantageous here for the flow straightener to be movable into the use position by way of simple actuation steps. It is particularly favourable here for the flow straightener to be deployable in one actuation step with the measuring funnel. The volumetric-flow measuring apparatus can thus be prepared so as to be ready for use in a single actuation step in which both, the measuring funnel and the flow straightener, are converted conjointly or successively in the use position.

By way of slackening the deployment device the flow straightener and/or the measuring funnel can conversely be folded up into the transport position in this way.

In one embodiment of the invention it may be provided for the measuring funnel to have a rigid frame on the air intake of the former. It is advantageous here for the measuring funnel to be placeable on a supply-air or exhaust-air opening of a building ventilation plant so as to be sufficiently sealed. To this end, sealing lips may be configured on the rigid frame in order to cause a tight seal.

It may be provided here that the deployment device engages on the or a rigid frame which is configured on an air intake of the measuring funnel. It is advantageous here for a rigid frame which is present in any case to be usable as a purchase point for a deployment device.

In one embodiment of the invention it may be provided for the flow straightener to be releasably connected to the measuring funnel. It is advantageous here that the flow straightener is exchangeable for another flow straightener, for example a flow straightener having other flow-straightening properties or for a reconditioned flow straightener.

Alternatively, it may be provided that the flow straightener is integrally connected to the measuring funnel. It is advantageous here for the flow straightener to be captively fastened on the measuring funnel. The flow straightener may be sewn into the measuring funnel, for example, or be welded or adhesively bonded or connected in another materially integral, force-fitting and/or form-fitting manner to the measuring funnel.

It is particularly favourable for the measuring funnel and the flow straightener to be made from an identical material.

In one embodiment of the invention it may be provided that the flow straightener at least in part is disposed in one half of the measuring funnel which is remote from the basic body and/or on an air intake of the measuring funnel, for example the previously mentioned air intake. It is advantageous here that effective flow straightening of the air flow is attainable. It may be provided, for example, that the flow straightener is completely disposed in the half of the measuring funnel which is remote from the basic body. It has emerged that this is sufficient and that a space in one half of the measuring funnel which faces the basic body can remain free without the effect of flow straightening being negated thereon.

In one embodiment of the invention it may be provided that the flow straightener in the use position forms an arrangement of air passages by way of which an air flow in the measuring funnel is homogenizable. It is advantageous here that a simple type of flow straightening is achieved. The arrangement of air passages makes it possible for flow angles which excessively deviate from a longitudinal direction of the flow straightener to be deflected or reflected back to the longitudinal direction. Turbulence in the air flow can thus be reduced. It is particularly favourable for the air passages in the use position to be configured in a tubular manner having, for example, a triangular, quadrangular, pentagonal, hexagonal or polygonal cross section. It is of advantage here that a lattice or honeycomb structure which has proven particularly favourable for flow straightening is formable.

It has proven favourable to employ lattice or honeycomb structures with a comparably coarse mesh, in which the ratio of length of the air passages to the diameter of the air passages is smaller than three, in particular is equal to or smaller than one. The smaller the numeric ratio, the more predominant the properties of a sieve in the structure and the flow-straightening function is lost. A good compromise is at a ratio of approximately or exactly one. This choice represents a favourable compromise between the necessary flow straightening and a dead weight of the volumetric-flow measuring apparatus which is as low as possible.

It may be provided here that the air passages are separated from one another by foldable separation walls. It is of advantage here for the air passages in the transport position to be folded up, so that they occupy a small space in the transport position.

The foldable material may be from fabric, leather and/or plastic, for example. It is thus readily achievable for sufficiently good foldability of the material with simultaneously sufficient stability to be provided.

BRIEF DESCRIPTION OF THE SEVERAL VIEWS OF THE DRAWINGS

The invention is now described in more detail by means of an exemplary embodiment but is not limited to this exemplary embodiment. Further exemplary embodiments are obtained by the combination of the features of individual or a plurality of claims with one another and/or with individual or a plurality of features of the exemplary embodiment.

In the figures, in a greatly simplified illustration for the purpose of explaining the invention:

FIG. 1 shows a volumetric-flow measuring apparatus according to the invention, in the transport position;

FIG. 2 shows the volumetric-flow measuring apparatus according to FIG. 1 when being converted from the transport position to the use position; and FIG. 3 shows the volumetric-flow measuring apparatus according to FIG. 1, in the use position.

DETAILED DESCRIPTION OF THE PREFERRED EMBODIMENT

FIGS. 1 to 3 are collectively described below.

A volumetric-flow measuring apparatus which in its entirety is identified with 1 has a measuring unit 2, which is known per se and is not illustrated in more detail here and which is disposed in a basic body 3, for measuring a volumetric flow. The measuring unit 2 here may be disposed so as to be removable or fixed in the basic body 3.

A measuring funnel 4 is disposed on the basic body 3.

The measuring funnel 4 is made from a foldable material and can be converted between a folded-up transport position (FIG. 1) and a deployed use position (FIG. 3) and back. FIG. 2 here shows an intermediate position in this conversion.

In the use position the measuring funnel 4 deploys a funnel opening 5 which for measuring the volumetric flow is placeable onto a supply-air or exhaust-air opening of a building ventilation plant in a manner known per se. The measuring funnel 4 thus serves for capturing an air flow and for infeeding this air flow into the measuring unit 2.

The volumetric-flow measuring apparatus according to the invention in the funnel opening 5 has a flow straightener 6 by way of which in the use position (FIG. 3) the mentioned air flow is homogenizable. In this manner a measuring error on account of a swirl in the air flow can be reduced or entirely eliminated.

In the case of the volumetric-flow measuring apparatus 1 according to the invention the flow straightener 6 is likewise made from a foldable material and can thus also be converted between a flat transport position (FIG. 1) and an unfolded use position (FIG. 3). FIG. 2 shows the flow straightener 6 in a partially deployed intermediate position.

It can be seen in FIG. 3 that the flow straightener 6 in the use position has adapted to the measuring funnel 4 and completely fills the funnel opening 5.

A deployment device 7, by way of which the measuring funnel 4 is deployable for conversion to the use position, is configured on the measuring funnel 4.

In a manner known per se, the deployment device 7 here may have an arrangement of tensioning rods which are interconnected in an articulated manner or another arrangement of tensioning rods.

Not only the measuring funnel 4 but also the flow straightener 6 is deployable by way of the deployment device 7 in one actuation step.

The deployment device 7 here engages on a rigid frame 8 which is configured on an air intake 9 of the measuring funnel 4. The rigid frame 8 serves for tightly placing the measuring funnel 4 onto the previously mentioned supply-air or exhaust-air opening of the building ventilation plant.

In other words, the deployment device 7 tensions the material of the measuring funnel 4 and thus of the flow straightener 6 in that the basic body 3 and the rigid frame 8 are pushed apart. After loosening the deployment device 7 the measuring funnel 4 and the flow straightener 6 can be folded up again so as to be flat.

In the case of the shown exemplary embodiment the flow straightener 6 has been manufactured from the same foldable material as the measuring funnel 4 and the former has been sewn into the latter. The flow straightener 6 is thus integrally connected to the measuring funnel 4.

In the case of further exemplary embodiments the flow straightener 6 is releasably connected to the measuring funnel 4, for example by way of a hook-and-loop fastener.

It can be identified in FIG. 3 that the flow straightener 6 in the use position is entirely disposed in one half 10 of the measuring funnel 4 which is remote from the basic body 3, on the air intake 9 of the measuring funnel 4.

The flow straightener 6 in the use position forms an arrangement of air passages 11.

The air passages 11 are in each case configured so as to be tubular, having a quadrangular cross section, and are separated from one another by separation walls 12.

The separation walls 12 are made from the same foldable material as the measuring funnel 4.

The separation walls 12 can thus be completely folded up in order to form the transport position according to FIG. 1.

The separation walls 12 in the deployed use position (FIG. 3) are oriented in a crossed arrangement in relation to one another, in order to form a lattice structure of air passages 11. This lattice structure is configured so as to be of comparatively coarse mesh. The air passages 11 in each case have a length which is less than three times the opening diameter of these air passages 11.

The measuring funnel 4 and the flow straightener 6 in the case of the shown exemplary embodiment are made from a fabric, for example a woven fabric, a warp-knitted fabric, a knitted fabric, a braided fabric, a stitch-bonded fabric from a non-woven material or from a felt, or any other planar textile formation. In the case of further exemplary embodiments the measuring funnel 4 and/or the flow straightener 6 may be made from leather or from plastic, for example from a plastic film, or from any other foldable material.

In the case of the volumetric-flow measuring apparatus 1 it is proposed to configure a measuring funnel 4 and a flow straightener 6, which is disposed in the measuring funnel 4, from a foldable material such that the measuring funnel 4 and the flow straightener 6 are convertible between a folded-up transport position and an unfolded use position.

The invention claimed is:

1. A volumetric-flow measuring apparatus comprising a basic body which receives a measuring unit, and a foldable measuring funnel, which is attached on the basic body, the measuring funnel is convertible from a transport position to a use position, a flow straightener formed from a foldable material is disposed in a funnel opening which is defined by the measuring funnel, the flow straightener is convertible between a transport position and a use position, and the flow straightener in the use position adapts to the measuring funnel.

2. The volumetric-flow measuring apparatus according to claim 1, further comprising a deployment device which deploys the measuring funnel from the transport position into the use position is present.

3. The volumetric-flow measuring apparatus according to claim 2, wherein the flow straightener is deployable by way of the deployment device in one actuation step with the measuring funnel.

4. The volumetric-flow measuring apparatus according to claim 2, wherein the deployment device engages on a rigid frame which is configured on an air intake of the measuring funnel.

5. The volumetric-flow measuring apparatus according to claim 1, wherein the flow straightener is releasably connected to the measuring funnel.

6. The volumetric-flow measuring apparatus according to claim 1, wherein the flow straightener is integrally connected to the measuring funnel.

7. The volumetric-flow measuring apparatus according to claim 1, wherein the flow straightener in the use position at least in part is disposed in one half of the measuring funnel which is remote from the basic body or an air intake of the measuring funnel.

8. The volumetric-flow measuring apparatus according to claim 1, wherein the flow straightener in the use position forms an arrangement of air passages by which an air flow in the measuring funnel is homogenizable.

9. The volumetric-flow measuring apparatus according to claim 8, wherein the air passages are separated from one another by foldable separation walls.

10. The volumetric-flow measuring apparatus according to claim 1, wherein the foldable material is made from at least one of fabric, leather, or plastic.

11. The volumetric-flow measuring apparatus according to claim 1, wherein the use position includes the flow straightener being placed under a tension force to inhibit folding of the flow straightener and the transport position includes the tension force being relaxed to allow folding of the flow straightener.

* * * * *